US010708201B2

(12) United States Patent
Koukoumidis et al.

(10) Patent No.: US 10,708,201 B2
(45) Date of Patent: Jul. 7, 2020

(54) RESPONSE RETRIEVAL USING COMMUNICATION SESSION VECTORS

(71) Applicant: Microsoft Technology Licensing, LLC, Redmond, WA (US)

(72) Inventors: Emmanouil Koukoumidis, Kirkland, WA (US); Joseph Edwin Johnson, Jr., Seattle, WA (US); Hailong Mu, Redmond, WA (US); Matthew W Schuerman, Kirkland, WA (US); Ying Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/455,285

(22) Filed: Jun. 27, 2019

(65) Prior Publication Data
US 2019/0386936 A1 Dec. 19, 2019

Related U.S. Application Data

(63) Continuation of application No. 15/639,282, filed on Jun. 30, 2017, now Pat. No. 10,374,982.

(51) Int. Cl.
*G06F 15/16* (2006.01)
*H04L 12/58* (2006.01)
*G06F 40/30* (2020.01)

(52) U.S. Cl.
CPC .............. *H04L 51/02* (2013.01); *G06F 40/30* (2020.01); *H04L 51/04* (2013.01)

(58) Field of Classification Search
CPC .......... H04L 51/02; H04L 51/04; G06F 40/30
See application file for complete search history.

(56) References Cited

U.S. PATENT DOCUMENTS

| 7,856,441 | B1* | 12/2010 | Kraft | G06F 16/951 707/758 |
|---|---|---|---|---|
| 9,715,496 | B1* | 7/2017 | Sapoznik | H04L 67/02 |
| 9,860,200 | B1* | 1/2018 | Braun | H04L 51/046 |
| 2008/0005051 | A1* | 1/2008 | Turner | G06F 40/242 706/20 |
| 2010/0235908 | A1* | 9/2010 | Eynon | G06F 21/552 726/22 |
| 2011/0112825 | A1* | 5/2011 | Bellegarda | G06F 40/30 704/9 |

(Continued)

OTHER PUBLICATIONS

"U.S. Appl. No. 15/639,282, Non Final Office Action dated Nov. 19, 2018", 12 pgs.

(Continued)

*Primary Examiner* — Jonathan A Bui
(74) *Attorney, Agent, or Firm* — Schwegman Lundberg & Woessner, P.A.

(57) ABSTRACT

Systems and methods are disclosed for response retrieval using communication session vectors. In one implementation, a first communication session is received. The first communication session includes a first communication. The first communication session is encoded as a first vector. A second vector is identified within a defined proximity of the first vector. The second vector represents a second communication session that includes a second communication. The second communication is provided within the first communication session in response to the first communication.

20 Claims, 6 Drawing Sheets

(56) References Cited

U.S. PATENT DOCUMENTS

| | | | | |
|---|---|---|---|---|
| 2013/0197900 | A1* | 8/2013 | Rotbart | G06F 40/30 704/9 |
| 2014/0229473 | A1* | 8/2014 | Mehrotra | G06F 16/3347 707/728 |
| 2014/0244744 | A1* | 8/2014 | Lyren | G06Q 50/01 709/204 |
| 2015/0286953 | A1* | 10/2015 | Papadopoullos | G06N 20/00 706/12 |
| 2016/0103996 | A1* | 4/2016 | Salajegheh | G06F 11/3024 726/25 |
| 2016/0112761 | A1* | 4/2016 | Venkataraman | H04N 21/4668 725/14 |
| 2016/0359771 | A1* | 12/2016 | Sridhar | H04L 51/02 |
| 2017/0134313 | A1* | 5/2017 | Poupart | H04L 51/02 |
| 2017/0270099 | A1* | 9/2017 | Gorny | G06F 40/30 |
| 2017/0344640 | A1* | 11/2017 | Goldstein | G06F 16/3344 |
| 2018/0052908 | A1* | 2/2018 | Liu | G06F 16/316 |
| 2018/0137101 | A1* | 5/2018 | Burchard | G06F 40/30 |
| 2018/0189628 | A1* | 7/2018 | Kaufmann | H04L 51/02 |
| 2018/0196796 | A1* | 7/2018 | Wu | G06N 20/10 |
| 2018/0240014 | A1* | 8/2018 | Strope | G06N 3/0454 |
| 2018/0285774 | A1* | 10/2018 | Soni | G06N 3/084 |
| 2018/0287968 | A1* | 10/2018 | Koukoumidis | G06F 40/35 |
| 2018/0316630 | A1* | 11/2018 | Jacobson | G06F 16/90332 |
| 2018/0373696 | A1* | 12/2018 | Terry | G06N 5/046 |
| 2019/0007350 | A1 | 1/2019 | Koukoumidis et al. | |
| 2019/0295114 | A1* | 9/2019 | Pavletic | G06Q 50/01 |

OTHER PUBLICATIONS

"U.S. Appl. No. 15/639,282, Notice of Allowance dated Mar. 20, 2019", 8 pgs.

"U.S. Appl. No. 15/639,282, Response filed Feb. 19, 2019 to Non Final Office Action dated Nov. 19, 2018", 6 pgs.

* cited by examiner

RESPONSE RETRIEVAL USING COMMUNICATION SESSION VECTORS

CLAIM OF PRIORITY

This application is a continuation of U.S. patent application Ser. No. 15/639,282, titled, "RESPONSE RETRIEVAL USING COMMUNICATION SESSION VECTORS", filed Jun. 30, 2017, which is hereby incorporated by reference in its entirety.

TECHNICAL FIELD

Aspects and implementations of the present disclosure relate to data processing and, more specifically, but without limitation, to response retrieval using communication session vectors.

BACKGROUND

Personal digital assistants are applications or services that retrieve information or execute tasks on behalf of a user. Users can communicate with such personal digital assistants using conversational interfaces such as messaging or chat interfaces.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, systems and methods are disclosed for response retrieval using communication session vectors. In one implementation, a first communication session is received. The first communication session includes a first communication. The first communication session is encoded as a first vector. A second vector is identified within a defined proximity of the first vector. The second vector represents a second communication session that includes a second communication. The second communication is provided within the first communication session in response to the first communication.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
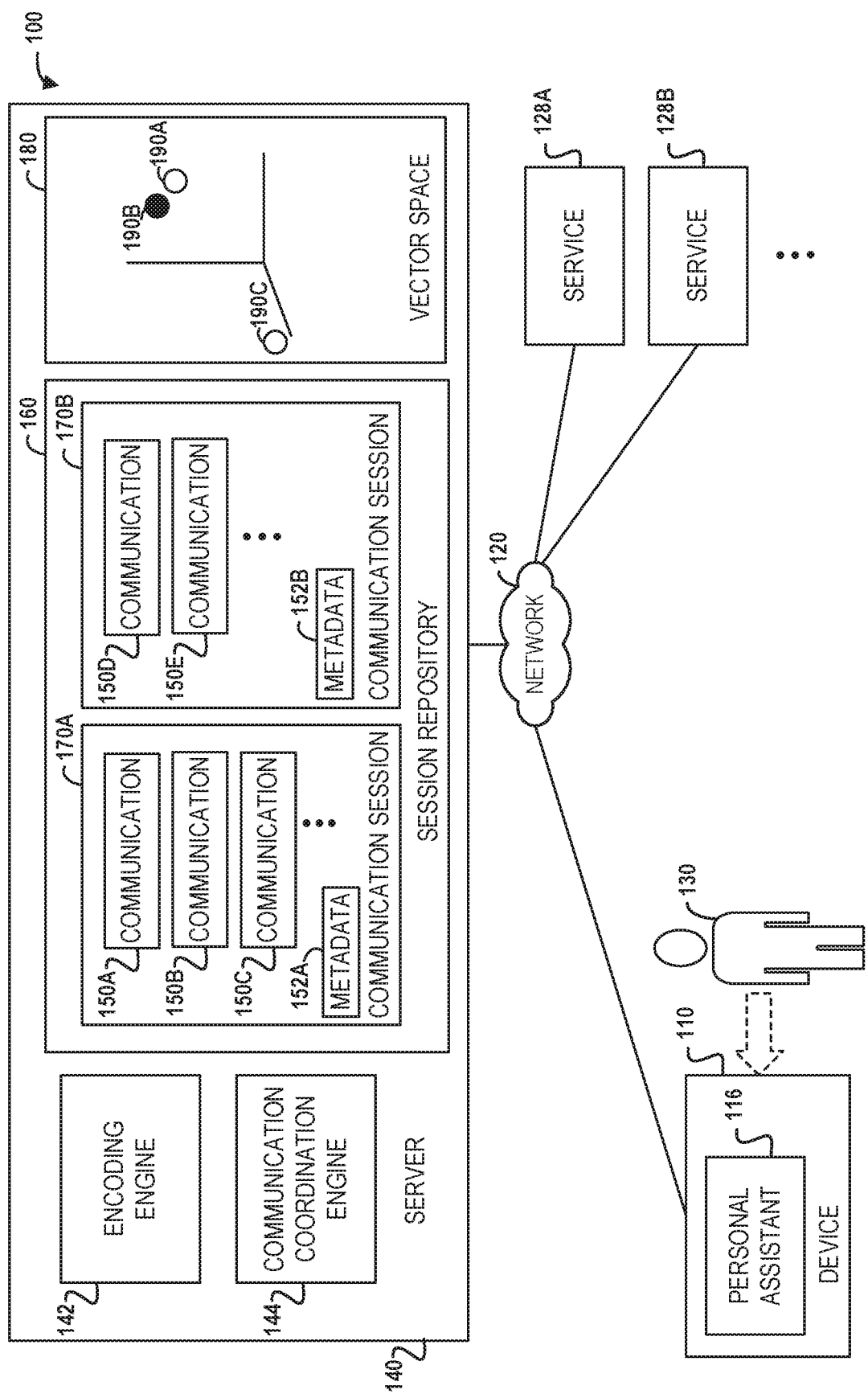
FIG. 1 illustrates an example system, in accordance with an example embodiment.

Aspects and implementations of the present disclosure are directed to response retrieval using communication session vectors.

It can be appreciated that intelligent personal assistants and related technologies can enable a user to obtain information, execute tasks, and perform other activities. Users can interact with or control such personal assistants via conversational interfaces such as messaging, chat, audio commands etc. Though such conversational interfaces provide a natural and intuitive medium for performing certain tasks, these interfaces are limited when attempting to mimic certain aspects of human conversation. For example, existing technologies can identify relevant content that is semantically similar or identical to communications/content provided by a user (e.g., including the same/similar words, entities, etc.). However, in many scenarios such related content may not contain the same (or even similar) words/entities to communications originating from the user (e.g., in scenarios in which different users refer to such entities using different words).

Accordingly, described herein in various implementations are technologies, including methods, machine readable mediums, and systems, that enable response retrieval using communication session vectors. In certain implementations, the described technologies encode a current conversation/communication session (e.g., between a human user and a personal assistant) as a vector. Similar vector(s) (corresponding to related conversations, such as those occurring between two or more human users) can then be identified within a vector space. Appropriate/relevant communication(s) can then be identified within such related conversation(s) and such communications may be further utilized within the current session. In doing so, relevant communications that are contextually appropriate can be identified and provided to the user, even in scenarios in which the respective sessions share few words/entities in common. Additionally, the described technologies can leverage communications originally occurring between human users to enhance subsequent communications provided by a personal assistant. For example, the personal assistant can incorporate a contextually relevant communication (originally provided by a human user) to provide a more natural and relevant experience.

It can therefore be appreciated that the described technologies are directed to and address specific technical challenges and longstanding deficiencies in multiple technical areas, including but not limited to communication interfaces, semantic relationships, and personal digital assistants. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

FIG. 1 illustrates an example system 100, in accordance with some implementations. As shown, the system 100 includes device 110 which can be a laptop computer, a desktop computer, a terminal, a mobile phone, a tablet computer, a smart watch, a personal digital assistant (PDA), a digital music player, a server, and the like. User 130 can be a human user who interacts with device 110. For example, user 130 can provide various inputs (e.g., via an input device/interface such as a keyboard, mouse, touchscreen, etc.) to device 110. Device 110 can also display, project, and/or otherwise provide content to user 130 (e.g., via output components such as a screen, speaker, etc.).

As shown in FIG. 1, device 110 can include personal assistant 116. Personal assistant 116 can be an application or module that configures/enables the device to interact with, provide content to, and/or otherwise perform operations on behalf of user 130. For example, personal assistant 116 can receive communications and/or request(s) from user 130 and present/provide responses to such request(s) (e.g., within a conversational or 'chat' interface). In certain implementations, personal assistant 116 can also identify content that can be relevant to user 130 (e.g., based on a location of the user or other such context) and present such content to the user. Personal assistant 116 can also enable user 130 to initiate and/or configure other application(s). For example, personal assistant 116 can initiate an application (e.g., a media player application) that fulfills a request provided by the user. Personal assistant 116 can also initiate and/or perform various other operations, such as are described herein.

It should be noted that while various components (e.g., personal assistant 116) are depicted and/or described as operating on a device 110, this is only for the sake of clarity. However, in other implementations the referenced components can also be implemented on other devices/machines. For example, in lieu of executing locally at device 110, aspects of personal assistant 116 can be implemented remotely (e.g., on a server device or within a cloud service or framework). By way of illustration, personal assistant 116 can be configured to execute on a remote device (e.g., server 140, as described below) and provide communications, information, etc., to device 110.

Figure 6:
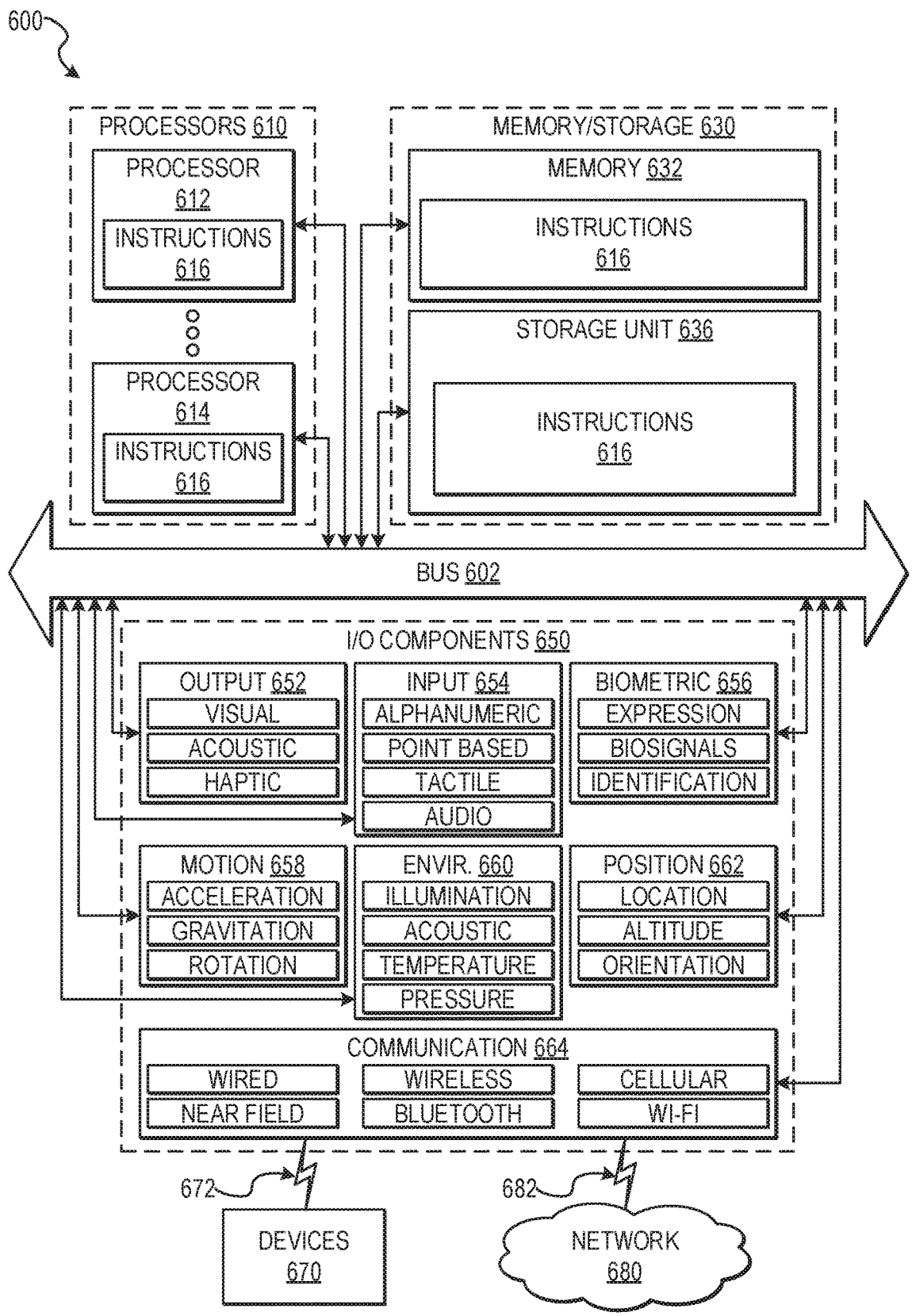
FIG. 6 is a block diagram illustrating components of a machine able to read instructions from a machine-readable medium and perform any of the methodologies discussed herein, according to an example embodiment.

In certain implementations, device 110 can include other applications, programs, modules, etc. The referenced applications can be stored in memory of device 110 (e.g. memory 630 as depicted in FIG. 6 and described below). One or more processor(s) of device 110 (e.g., processors 610 as depicted in FIG. 6 and described below) can execute such application(s). In doing so, device 110 can be configured to perform various operations, present content to user 130, etc. Examples of such applications include but are not limited to: social media/messaging applications, applications that facilitate transactions (e.g., food purchases), etc.

It should also be noted that while various components (e.g., personal assistant 116) are depicted (e.g., in FIG. 1) as operating on device 110, this is only for the sake of clarity. However, in other implementations the referenced component can also be implemented on other devices/machines. For example, in lieu of executing locally at device 110, personal assistant 116 can be implemented remotely (e.g., on a server device or within a cloud service or framework).

As also shown in FIG. 1, device 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include encoding engine 142, communication coordination engine 144, session repository 160, and vector space 180.

Session repository 160 can include various communication sessions (e.g., communication session 170A, communication session 170B) (collectively, communication sessions 170). Such a communication session 170 can be a series of communications 150 (e.g., messages originating from various users/sources) that are provided in relation to one another (e.g., in a sequence, in response to one another, within a defined amount of time/chronological proximity to one another, etc.). In certain implementations, such a communication session can refer to a group or set of communications provided back-and-forth between various users, applications, etc., e.g., during a conversation conducted via a messaging, chat, social networking, etc. service/application. Such communications 150 (e.g., communication 150A, communication 150B, etc., as shown in FIG. 1) can be stored as a communication session 170 within session repository 160. For example, as shown in FIG. 1, communication 150A (e.g., a communication from one user) and communication 150B (e.g., a response provided by another user) can be stored together and/or in association with one another within communication session 170A.

In certain implementations, communication session 170 can also store metadata (e.g., metadata 152A as stored in communication session 170A). Such metadata can include information or other characteristics of a communication session. For example, metadata 152 can include or reflect various aspects of the emotion(s) associated with the associated communications. In certain implementations, such emotion(s) (e.g., happiness, sadness, excitement, etc.) can be identified, for example, using various sentiment analysis techniques.

Encoding engine 142 can be an application or module that configures/enables server 140 to perform various operations such as are described herein. For example, encoding engine 142 can configure or enable server 140 to process/analyze communication sessions 170, such as those stored in session repository 160. Encoding engine 142 can further generate various representations or models (e.g., multidimensional vectors) of the referenced communications/communication sessions. Such representations/vectors can be models that reflect the respective communications contained within a communication session (as well as the content of such communications, e.g., entities, topics, etc., referenced within such communications). For example, various words, entities, concepts, etc., can be identified within a communication (e.g., using various natural language processing techniques). Such words, entities, etc., can then be mapped to vectors (e.g., of real numbers) as reflected in a vector space, e.g., using various language modeling and/or feature learning techniques.

The various vectors generated by encoding engine 142 can be stored within an index such as vector space 180. For example, as shown in FIG. 1, vectors 190A, 190B, and 190C are generated by encoding engine 142 and stored within vector space 180. Each of the referenced vectors can correspond to a difference communication session (e.g., vector 190A corresponds to communication session 170A, vector 190B corresponds to communication session 170B, etc.). Additionally, the vectors 190 can be stored within vector space 180 such that vectors that are more related (e.g., based on content contained within their respective communications, metadata/other characteristics, etc.) are positioned relatively closer together within the vector space. Accordingly, vectors 190A and 190B can be determined (based on their relatively close proximity within vector space 180) to be related to one another (while vector 190C, which is positioned relatively further away, is relatively unrelated to the other vectors).

Communication coordination engine 144 can be an application or module that configures/enables server 140 to perform various operations such as are described herein. For example, communication coordination engine 144 can configure or enable server 140 to utilize the referenced vectors 190 (as stored in vector space 180) to identify or generate communications to be provided to a user, e.g., via a personal assistant. As described herein, communication coordination engine 144 can receive (or access) a current conversation/communication session (e.g., between user 130 and personal assistant 116), and encode the communication session as a vector. Using vector space 180, other vector(s) can be identified that are similar/related to the current communication session. Such similar/relevant vectors can then be used to identify an appropriate/relevant communication to be provided within the current communication session. In doing so, relevant communications that are contextually appropriate can be identified and provided to the user.

In various implementations, the described technologies may control, instruct, or otherwise communicate with various services such as service 128A and service 128B (collectively services 128), as shown in FIG. 1. Such services can be, for example, third-party services that can provide various functionality, e.g., to user 130 (e.g., social media services, food delivery services, etc.) that may enhance or otherwise be relevant to certain operations described herein.

While many of the examples described herein are illustrated with respect to a single server 140, this is simply for the sake of clarity and brevity. However, it should be understood that the described technologies can also be implemented (in any number of configurations) across multiple servers and/or other computing devices/services.

Further aspects and features of device 110 and server 140 are described in more detail in conjunction with FIGS. 2-6, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
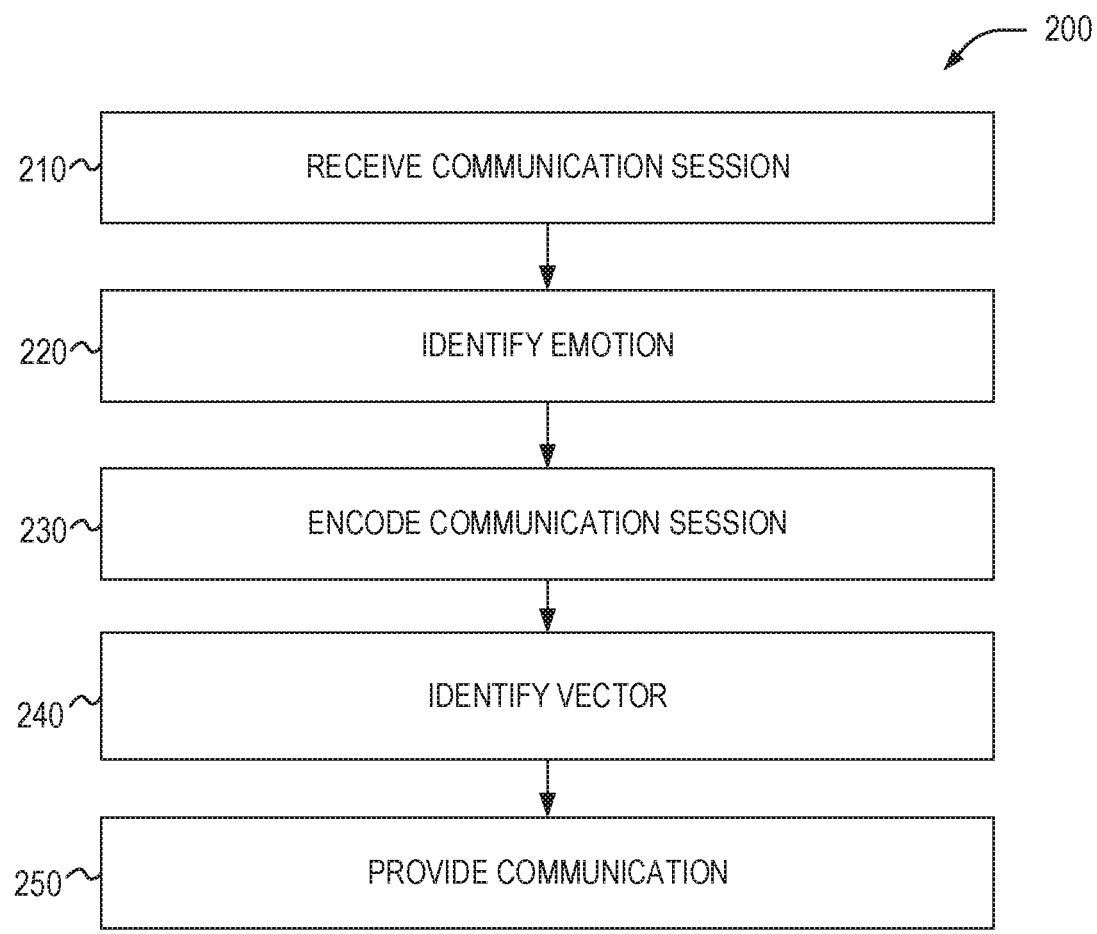
FIG. 2 is a flow chart illustrating a method, in accordance with an example embodiment, for response retrieval using communication session vectors.

FIG. 2 is a flow chart illustrating a method 200, according to an example embodiment, for response retrieval using communication session vectors. The method is performed by processing logic that can comprise hardware (circuitry, dedicated logic, etc.), software (such as is run on a computing device such as those described herein), or a combination of both. In one implementation, the method 200 is performed by one or more elements depicted and/or described in relation to FIG. 1 (including but not limited to server 140, encoding engine 142, and/or communication coordination engine 144), while in some other implementations, the one or more blocks of FIG. 2 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 210, a first communication session (or a portion/segment thereof) is received. Such a communication session can include a first communication, e.g., a communication originating from a user (e.g., user 130). Such a communication can be, for example, a message/transmission (e.g., as provided within a messaging/chat interface or any other such communication framework). Such a communication session can include or reflect several communications that are provided in relation to one another (e.g., in a sequence, in response to one another, within a defined amount of time/chronological proximity to one another, etc.).

Figure 3:
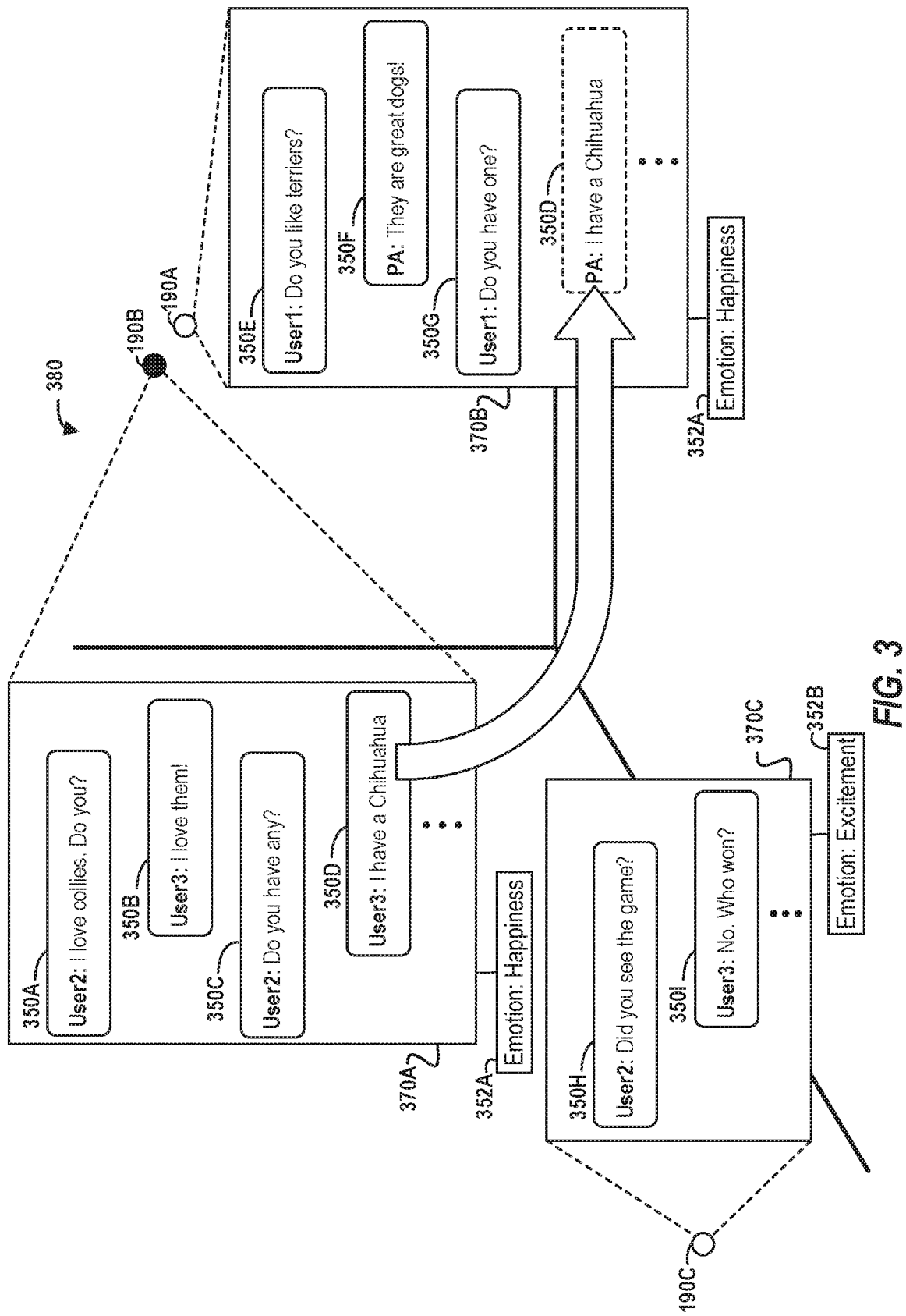
FIG. 3 illustrates an example scenario described herein, according to an example embodiment.

For example, FIG. 3 depicts an example scenario in which communication session 370B is received. Such a communication session can be a sequence of communications between a user ('User1') and a personal assistant ('PA'). As shown in FIG. 3, communication session 370B can include communication 350E originating from 'User1' ("Do you like terriers?").

Figure 4:
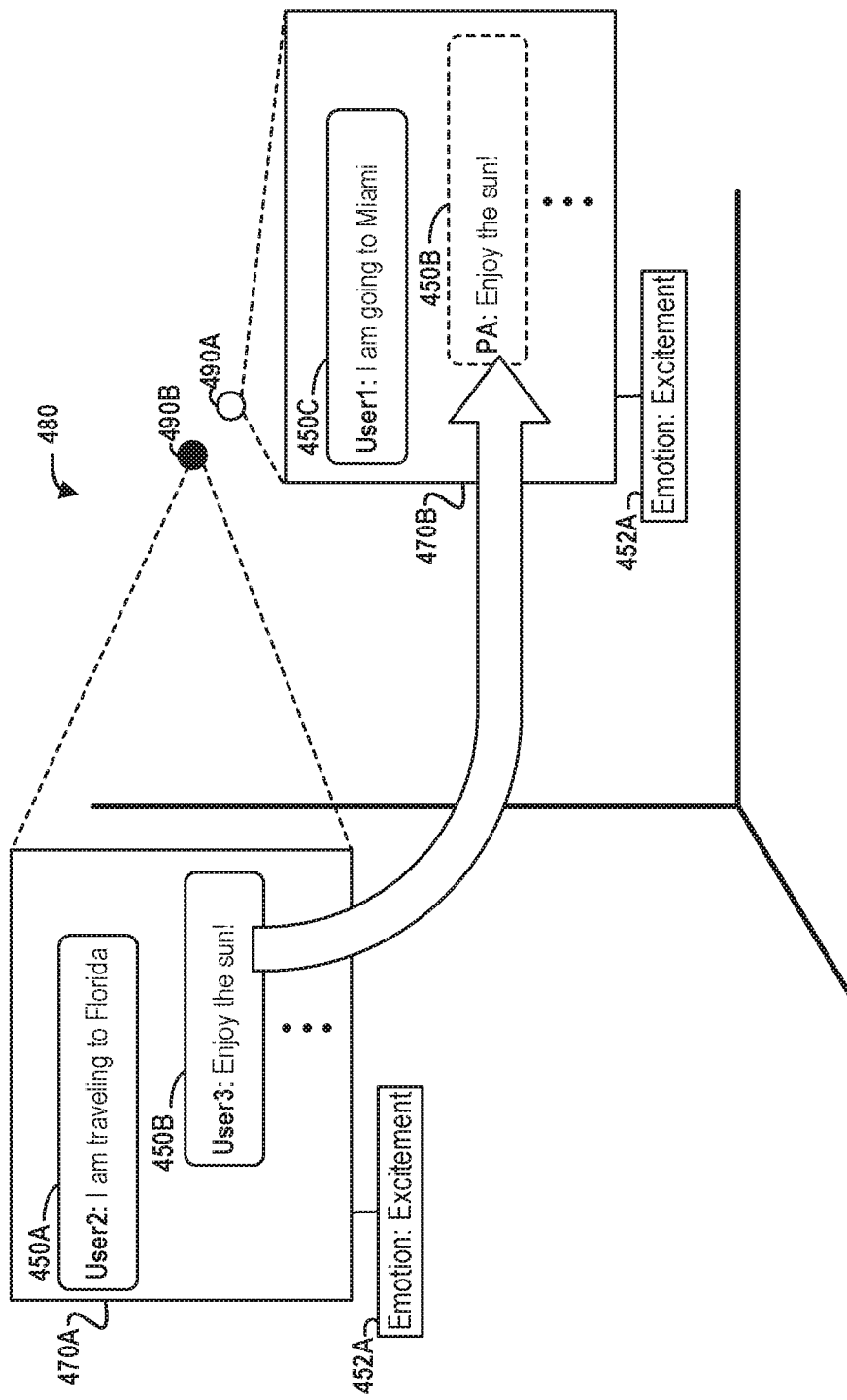
FIG. 4 illustrates an example scenario described herein, according to an example embodiment.

By way of further example, FIG. 4 depicts an example scenario in which communication session 470B is received. Such a communication session can be a sequence of communications between a user ('User1') and a personal assistant ('PA'). As shown in FIG. 4, communication session 470B can include communication 450C originating from 'User1' ("I am going to Miami").

At operation 220, an emotion associated with the first communication session is identified. For example, various sentiment analysis techniques (e.g., based on the tone of communications originating from a user) can be applied to the communications of communication session 370B to determine emotion(s) (e.g., happiness) associated with the communication session, various degrees, intensities, etc., associated with such emotion(s), etc. Such identified emotion(s) can be stored/associated with the communication session (e.g., as metadata 352A, as shown in FIG. 3). It should be understood that, in certain implementations, the referenced emotions can include multiple emotions (e.g., a certain degree of happiness, another degree of excitement, etc.).

At operation 230, the first communication session (e.g., the communication session received at operation 210) is encoded as a vector (or other such representation). In doing so, a vector such as a multidimensional vector can be generated which reflects the various communications contained within the communication session. Such a vector can be stored within an index such as a vector space. Additionally, in certain implementations the referenced vector can be encoded using various deep learning techniques. In doing so, the vector can represent various similarities between concepts reflected in the various communications (e.g., even in scenarios—such as those described/illustrated herein—in which related concepts are associated with different words).

For example, as shown in FIG. 3, vector 190A can be generated which reflects the various aspects of the communications included within communication session 370B (e.g., communications 350E, 350F, 350G). Additionally, in certain implementations such a vector 190A can be encoded to further reflect additional aspects/metadata associated with the communication session 370B, such as metadata 352A (corresponding to the emotion associated with the communication session). The generated vector 190A can be stored within multidimensional vector space 380, as shown.

By way of further example, as shown in FIG. 4, vector 490A can be generated which reflects the various aspects of the communications included within communication session 470B (e.g., communication 450C). Additionally, in certain implementations such a vector 490A can be encoded to further reflect additional aspects/metadata associated with the communication session 470B, such as metadata 452A (corresponding to the emotion associated with the communication session). The generated vector 490A can be stored within multidimensional vector space 480, as shown.

At operation 240, a second vector is identified. In certain implementations, such a vector can be identified within the same vector space/index referenced above. Additionally, in certain implementations such a second vector can be identified within a certain proximity of the first vector (e.g., the vector encoded at operation 230). In certain implementations, such a proximity can be identified/determined using nearest neighbor search and/or other such techniques to compute the referenced proximity between vectors. Such a second vector can represent another communication session (which is made up of other communication(s)).

For example, as shown in FIG. 3, vector 190B can be identified, e.g., as the vector within vector space 380 that is closest to vector 190A. As shown in FIG. 3, vector 190B is a representation of communication session 370A which includes various communications between 'User2' and 'User3' (e.g., communications 350A, 350B, 350C, 350D and the like). It should be noted that such users are not participants in communication session 370B (though, in other implementations, the described technologies can also utilize communication sessions having common participants). In contrast, vector 190C (corresponding to communication session 370C which includes communications 350H and 350I and metadata 352B) is positioned relatively far away from vectors 190A and 190B (on account of such a vector 190C being unrelated/irrelevant to the content of communication sessions 370A and 370B).

By way of further example, as shown in FIG. 4, vector 490B can be identified, e.g., as the vector within vector space 480 that is closest to vector 490A. As shown in FIG. 4, vector 490B is a representation of communication session 470A which includes various communications between 'User2' and 'User3' (e.g., communications 450A, 450B, etc.).

As noted above, in certain implementations metadata (e.g., emotions) can be associated with such communication sessions and further reflected in their corresponding vectors. Accordingly, identifying other vector(s) that are close in proximity to a first vector (e.g., within a vector space) can further account for such metadata. For example, as shown in FIG. 3, communication session 370A is also associated with metadata 352A (corresponding to the emotion of happiness), as reflected in the close proximity between vector 190B and vector 190A.

At operation 250, a communication from the communication session corresponding to the second vector (as identified at operation 250) is provided within the first communication session.

For example, as shown in FIG. 3, having identified communication session 370A as being highly relevant to communication session 370B (based on the proximity of vectors 190A and 190B), communication 350D can be selected (from communication session 370A) and provided within communication session 370B. In doing so, even though various words, entities, etc., within the respective communication sessions are not necessarily semantically similar (e.g. 'collies' in session 370A and 'terriers' in session 370B), the respective vector representations can reflect the overall relevance/similarities between the communication sessions. Accordingly, having identified such relevance/similarity, communication 350D can be identified as contextually relevant/appropriate to the communication sequence of communication session 370B.

Figure 5B:
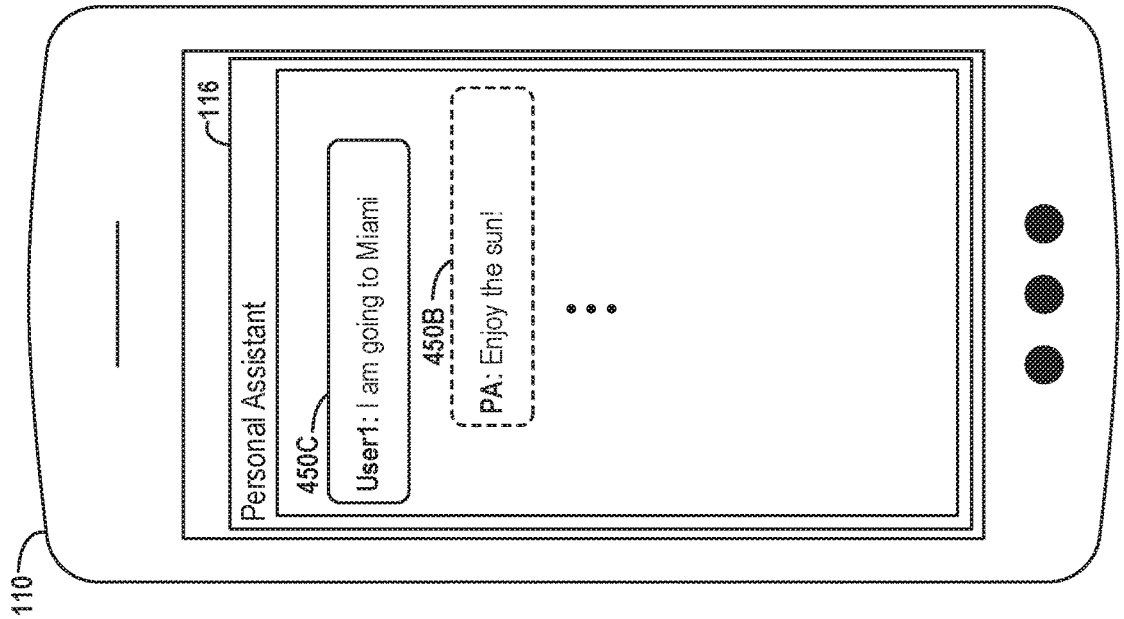
FIGS. 5A and 5B illustrate example scenarios described herein, according to an example embodiment.
Figure 5A:
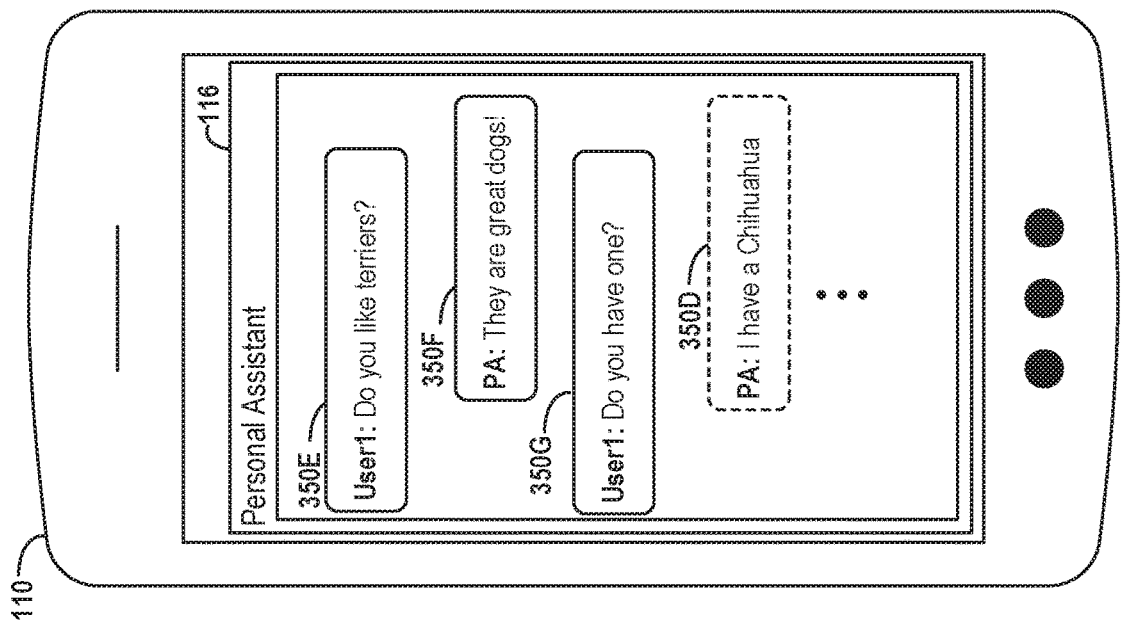

Having identified such relevance, communication 350D can be inserted/provided within communication session 370B (e.g., by the referenced personal assistant). Such a communication 350D can be inserted based on its position within communication session 370A as the next communication following the portion/segment of the communication session determined to be relevant to communication session 370B (thus suggesting that communication 350D is a contextually relevant/appropriate response to be provided within communication session 370B, as shown). In doing so, the personal assistant provides a communication to the user that is determined (e.g., based on communication session 370A) to be contextually relevant. FIG. 5A depicts an example graphical user interface of personal assistant 116 in which communication 350D has been inserted into the communication session in the manner described above. It should be understood that in certain implementations such a communication can be inserted verbatim into the referenced communication session (e.g., as shown with respect to communication 350D). In other implementations, various modifications or adjustments can be made to the communication prior to/in conjunction with inserting it into the communication session (e.g., to personalize the communication, etc.).

By way of further example, as shown in FIG. 4, having identified communication session 470A as being highly relevant to communication session 470B (based on the proximity of vectors 490A and 490B), communication 450B can be selected (from communication session 470A) and provided within communication session 470B. In doing so, even though various words, entities, etc., within the respective communication sessions are not necessarily semantically similar (e.g. 'traveling to Florida' in session 470A and 'going to Miami' in session 470B), the respective vector representations can reflect the overall relevance/similarities between the communication sessions. Accordingly, having identified such relevance/similarity, communication 450B can be identified as contextually relevant/appropriate to the communication sequence of communication session 470B. Having identified such relevance, communication 450B can be inserted/provided within communication session 470B (e.g., by the referenced personal assistant). In doing so, the personal assistant provides a communication to the user that is determined (e.g., based on communication session 470A) to be contextually relevant. FIG. 5B depicts an example graphical user interface of personal assistant 116 in which communication 450B has been inserted into the communication session in the manner described above.

It should also be noted that while the technologies described herein are illustrated primarily with respect to response retrieval using communication session vectors, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-5B are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 6 is a block diagram illustrating components of a machine 600, according to some example implementations, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. The instructions 616 transform the general, non-programmed machine into a particular machine programmed to carry out the described and illustrated functions in the manner described. In alternative implementations, the machine 600 operates as a standalone device or can be coupled (e.g., networked) to other machines. In a networked deployment, the machine 600 can operate in the capacity of a server machine or a client machine in a server-client network environment, or as a peer machine in a peer-to-peer (or distributed) network environment. The machine 600 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 can include processors 610, memory/storage 630, and I/O components 650, which can be configured to communicate with each other such as via a bus 602. In an example implementation, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 612 and a processor 614 that can execute the instructions 616. The term "processor" is intended to include multi-core processors that can comprise two or more independent processors (sometimes referred to as "cores") that can execute instructions contemporaneously. Although FIG. 6 shows multiple processors 610, the machine 600 can include a single processor with a single core, a single processor with multiple cores (e.g., a multi-core processor), multiple processors with a single core, multiple processors with multiples cores, or any combination thereof.

The memory/storage 630 can include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 can also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions (e.g., instructions 616) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 can include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 can include many other components that are not shown in FIG. 6. The I/O components 650 are grouped according to functionality merely for simplifying the following discussion and the grouping is in no way limiting. In various example implementations, the I/O components 650 can include output components 652 and input components 654. The output components 652 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 650 can include biometric components 656, motion components 658, environmental components 660, or position components 662, among a wide array of other components. For example, the biometric components 656 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 can include acceleration sensor components (e.g., accelerometer), gravitation sensor components, rotation sensor components (e.g., gyroscope), and so forth. The environmental components 660 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 662 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 650 can include communication components 664 operable to couple the machine 600 to a network 680 or devices 670 via a coupling 682 and a coupling 672, respectively. For example, the communication components 664 can include a network interface component or other suitable device to interface with the network 680. In further examples, the communication components 664 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 can be another machine or any of a wide variety of peripheral devices (e.g., a peripheral device coupled via a USB).

Moreover, the communication components 664 can detect identifiers or include components operable to detect identifiers. For example, the communication components 664 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 664, such as location via Internet Protocol (IP) geolocation, location via Wi-Fi® signal triangulation, location via detecting an NFC beacon signal that can indicate a particular location, and so forth.

In various example implementations, one or more portions of the network 680 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 can include a wireless or cellular network and the coupling 682 can be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 can be transmitted or received over the network 680 using a transmission medium via a network interface device (e.g., a network interface component included in the communication components 664) and utilizing any one of a number of well-known transfer protocols (e.g., HTTP). Similarly, the instructions 616 can be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
   a processing device; and
   a memory coupled to the processing device and storing instructions that, when executed by the processing device, cause the system to perform operations comprising:
   receiving a first conversation including a first word;
   identifying an emotion associated with the first conversation;
   encoding the first conversation and the emotion as a first vector;
   identifying a second vector within a defined proximity of the first vector, the second vector representing a second conversation that includes a second word; and
   responsive to identifying the second vector as being within the defined proximity, providing the second word within the first conversation in response to the first word.

2. The system of claim 1, wherein identifying the second vector comprises identifying the second vector based on the emotion.

3. The system of claim 1, wherein encoding the first conversation comprises encoding a plurality of conversations as the first vector.

4. The system of claim 1, wherein the first conversation comprises a conversation associated with a first user.

5. The system of claim 1, wherein the second conversation comprises a conversation associated with a second user.

6. The system of claim 1, wherein identifying the second vector comprises identifying the second vector within a vector space.

7. The system of claim 1, wherein identifying the second vector comprises identifying the second vector within a vector index.

8. A method comprising:
   receiving a first conversation comprising a first word;
   identifying an emotion associated with the first conversation;
   encoding the first conversation and the emotion as a first vector;
   based on the emotion, identifying a second vector within a defined proximity of the first vector, the second vector representing a second conversation that includes a second word; and
   providing the second word within the first conversation in response to the first word.

9. The method of claim 8, wherein identifying the second vector comprises identifying the second vector based on the emotion.

10. The method of claim 8, wherein encoding the first conversation comprises encoding a plurality of conversations as the first vector.

11. The method of claim 8, wherein the first conversation comprises a conversation associated with a first user.

12. The method of claim 8, wherein the second conversation comprises a conversation associated with a second user.

13. The method of claim 8, wherein identifying the second vector comprises identifying the second vector within a vector space.

14. The method of claim 8, wherein identifying the second vector comprises identifying the second vector within a vector index.

15. A non-transitory computer-readable medium having instructions stored thereon that, when executed by a processing device, cause the processing device to perform operations comprising:
    receiving a first conversation comprising a first word;
    identifying an emotion associated with the first conversation;
    encoding the first conversation and the emotion as a first vector;
    identifying, within a vector space, a second vector within a defined proximity of the first vector, the second vector representing a second conversation that includes a second word; and
    providing the second word within the first conversation in response to the first word.

16. The computer-readable medium of claim 15, wherein identifying the second vector comprises identifying the second vector based on the emotion.

17. The computer-readable medium of claim 15, wherein encoding the first communication session comprises encoding a plurality of conversations as the first vector.

18. The computer-readable medium of claim 15, wherein the first conversation comprises a conversation associated with a first user.

19. The computer-readable medium of claim 15, wherein the second conversation comprises a conversation associated with a second user.

20. The computer-readable medium of claim 15, wherein identifying the second vector comprises identifying the second vector within a vector space.

* * * * *